(12) United States Patent
Doddakula

(10) Patent No.: US 9,937,799 B2
(45) Date of Patent: Apr. 10, 2018

(54) PANTOGRAPH DOWN STOP FOR TROLLEY

(71) Applicant: Caterpillar Inc., Peoria, IL (US)

(72) Inventor: Vamsi Krishna Doddakula, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 223 days.

(21) Appl. No.: 14/921,685

(22) Filed: Oct. 23, 2015

(65) Prior Publication Data

US 2017/0113554 A1 Apr. 27, 2017

(51) Int. Cl.
*B60L 5/16* (2006.01)
*B60L 5/08* (2006.01)

(52) U.S. Cl.
CPC ........ *B60L 5/16* (2013.01); *B60L 5/08* (2013.01); *B60L 2200/40* (2013.01)

(58) Field of Classification Search
CPC ...... B60L 5/24; B60L 5/26; B60L 5/16; B60L 5/00; B60L 5/12; B61D 17/00; B60P 9/06; B60M 1/32
See application file for complete search history.

(56) References Cited

U.S. PATENT DOCUMENTS

| | | | | |
|---|---|---|---|---|
| 1,844,586 A * | 2/1932 | Mclaughlin | ............... | B60L 5/24 191/66 |
| 4,413,710 A * | 11/1983 | Milleville | ................. | B60L 5/14 191/70 |
| 4,585,910 A * | 4/1986 | Arai | .......................... | B60L 5/28 191/65 |
| 5,124,510 A * | 6/1992 | Garfinkle | .................. | B60L 5/19 191/59.1 |
| 5,584,369 A * | 12/1996 | Makino | ..................... | B60L 5/00 105/1.4 |
| 2006/0060105 A1* | 3/2006 | Webster | ................. | A63H 19/26 105/1.5 |
| 2009/0104007 A1* | 4/2009 | Umezawa | ............... | B66F 9/063 414/349 |

(Continued)

FOREIGN PATENT DOCUMENTS

| | | |
|---|---|---|
| EP | 2857252 | 4/2015 |
| JP | 2007238104 | 9/2007 |
| JP | 5389217 | 1/2014 |

*Primary Examiner* — Jason C Smith
(74) *Attorney, Agent, or Firm* — James S. Bennin; Miller, Matthias & Hull

(57) ABSTRACT

A pantograph assembly configured to transfer electrical power from an overhead conductor to a machine is disclosed. The pantograph assembly may include a pantograph base detachably mounted to the machine, an articulated linkage assembly having a linkage assembly lower end operatively connected to the pantograph base and a linkage assembly upper end pivotally connected to the linkage assembly lower end, a collector rail assembly operatively connected to the linkage assembly upper end, and a stop member. The stop member may be connected to the pantograph base and engaging the articulated linkage assembly, or connected to the articulated linkage assembly and engaging the pantograph base, to prevent the articulated linkage assembly from being lowered toward the pantograph base below a predetermined down position or lower limit position. A latch assembly may be mounted on the pantograph base and operable to move between a latch locked position and a latch unlocked position.

20 Claims, 4 Drawing Sheets

(56) References Cited

U.S. PATENT DOCUMENTS

2013/0105263 A1* 5/2013 Doddakula .............. B60L 5/08
            191/59
2013/0105264 A1* 5/2013 Ruth ....................... B60L 5/26
            191/59.1
2017/0113554 A1* 4/2017 Doddakula .............. B60L 5/08

* cited by examiner

US 9,937,799 B2

PANTOGRAPH DOWN STOP FOR TROLLEY

TECHNICAL FIELD

The present disclosure relates generally to machines that can be powered by electricity and, more particularly, to pantograph assemblies that can be raised and lowered to selectively transfer electrical power from an overhead conductor to such machines.

BACKGROUND

Machines such as trolley-assist vehicles or electric locomotives generally employ a pantograph assembly to provide electric power to the machine. Typically, the pantograph assembly is carried on top of the machine. The pantograph assembly is configured to draw electrical power from an overhead conductor and transfer the power to the machine. On machines such as off highway trucks, the pantograph assembly is raised and lowered to make connection with the overhead conductors. When the pantograph is lowered and the machine travels over an uneven work surface, the components of the pantograph assembly may be jostled, thereby creating stresses in the components and the actuation mechanisms that control the raising and lowering of the pantograph assembly.

U.S. Pat. No. 1,844,586 issued to McLaughlin on Jul. 23, 1931, teaches a hold down device for a pantograph assembly. One type of hold down device contemplated by McLaughlin comprises generally a crank arm fixed on an actuating shaft, and a hook pivotally mounted at a pivot pin on the crank arm. Rotation of the actuating shaft in one direction causes the hook to be swung into engagement with the stirrup on an upper link of the pantograph, and then move downward in a substantially vertical direction. The hook is spring-pressed against the stirrup so that there is no danger of the hook becoming disengaged from the stirrup. The actuating shaft imparts both rotary and translational motion to the hook and the hold down device locks the pantograph in the collapsed position, and depresses the upper links of the pantograph to the limit of their downward movement. Despite the teaching by the McLaughlin patent, not all locking mechanisms provide complex motion that locks the pantograph in the collapsed position and limits movement of its components.

SUMMARY OF THE DISCLOSURE

In one aspect of the present disclosure, a pantograph assembly configured to transfer electrical power from an overhead conductor to a machine is disclosed. The pantograph assembly may include a pantograph base detachably mounted to the machine, an articulated linkage assembly having a linkage assembly lower end operatively connected to the pantograph base and a linkage assembly upper end pivotally connected to the linkage assembly lower end, a collector rail assembly operatively connected to the linkage assembly upper end, and a stop member. The stop member may be connected to the pantograph base and engaging the articulated linkage assembly, or connected to the articulated linkage assembly and engaging the pantograph base, to prevent the articulated linkage assembly from being lowered toward the pantograph base below a predetermined lower limit position.

In another aspect of the present disclosure, a pantograph assembly configured to transfer electrical power from an overhead conductor to a machine is disclosed. The pantograph assembly may include a pantograph base detachably mounted to the machine, an articulated linkage assembly, a collector rail assembly, a stop member and a latch assembly. The articulated linkage assembly may include a thrust rod pivotally mounted to the pantograph base, a lower arm having a lower arm first end connected to the thrust rod, and an upper arm having an upper arm first end pivotally connected to a lower arm second end of the lower arm. The collector rail assembly may be operatively connected to an upper arm second end of the upper arm of the articulated linkage assembly and have a locking bar, wherein rotation of the thrust rod in a first thrust rod direction raises the articulated linkage assembly relative to the pantograph base and rotation of the thrust rod in a second thrust rod direction opposite the first thrust rod direction lowers the articulated linkage assembly relative to the pantograph base. The stop member may be mounted on and rotatable with the thrust rod, and may have a lower limit surface that rotates into engagement with the pantograph base to prevent the articulated linkage assembly and the collector rail assembly from being lowered toward the pantograph base below a predetermined lower limit position. The latch assembly may be mounted on the pantograph base and operable to move between a latch locked position and a latch unlocked position. The latch assembly may be actuated to move to the latch locked position and engage the locking bar when the articulated linkage assembly is in the predetermined lower limit position. The latch assembly when engaging the locking bar may prevent the articulated linkage assembly and the collector rail assembly from moving upwardly from the predetermined lower limit position as the machine moves over a work surface.

In a further aspect of the present disclosure, a pantograph assembly configured to transfer electrical power from an overhead conductor to a machine is disclosed. The pantograph assembly may include a pantograph base detachably mounted to the machine, an articulated linkage assembly having a linkage assembly lower end operatively connected to the pantograph base and a linkage assembly upper end pivotally connected to the linkage assembly lower end, a collector rail assembly operatively connected to the linkage assembly upper end, and a stop means operatively connected to the articulated linkage assembly and engaging the pantograph base to prevent the articulated linkage assembly and the collector rail assembly from being lowered toward the pantograph base below a predetermined lower limit position.

Additional aspects are defined by the claims of this patent.

DETAILED DESCRIPTION

Figure 1:
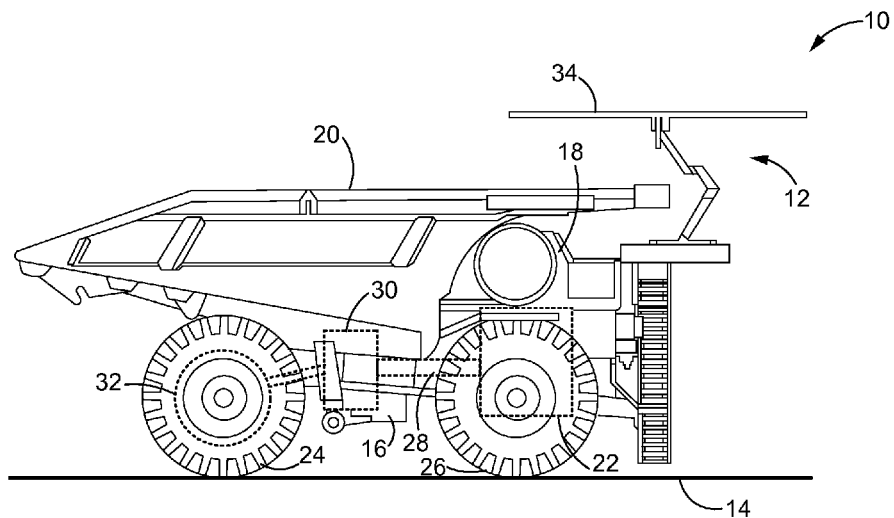
FIG. 1 is a side view of a machine having a pantograph assembly in accordance with the present disclosure installed thereon and with the pantograph assembly in a raised position.

FIG. 1 illustrates a schematic side view of a machine 10 having a pantograph assembly 12 mounted thereon. The machine 10 may include a vehicle such as an off-highway truck or other vehicle used in mining, construction, quarrying or other applications. One example of the machine 10 is the off-highway truck illustrated in FIG. 1 traveling over a work surface 14 and including a chassis 16 that supports an operator cab 18 and a dump body 20. The dump body 20 may be pivotally connected to the chassis 16 and arranged to carry a payload when the machine 10 is in use. The machine 10 may include a power source 22 that may be, for example, an engine such as internal combustion, gas, diesel, gaseous fuel, natural gas, propane or the like). The power source 22 may be of any size, with any number of cylinders, and in any configuration, such as "V," in-line, radial or the like, that will propel the machine 10 over the work surface 14 as desired. The chassis 16 may also support various drive system components. The drive system components are capable of driving a set of drive wheels 24 to propel the machine 10. A set of idle wheels 26 can pivot to steer the machine 10 to move in any desired direction.

In the illustrated embodiments, the power source 22 may produce an output torque at an output shaft 28. The output shaft 28 of the power source 22 may be connected to a generator 30. In operation, the output shaft 28 of the power source 22 rotates a rotor (not shown) of the generator 30 to produce electrical power to drive motors 32 associated with the drive wheels 24. The drive motors 32 may be connected via intermediate assemblies or directly to drive wheels 24 of the machine 10, and may be capable of being operated at variable speeds.

The machine 10 may further include the pantograph assembly 12 mounted at the front of the machine 10. Alternatively, the machine 10 may include two or more pantograph assemblies 12 connected to each other and controlled to be raised and lowered together. The pantograph assembly 12 may be configured to supply electrical power from the overhead conductors 34 to the machine 10. Electrical power from the overhead conductors 34 may act as a power source to assist in propulsion of the machine 10. The pantograph assembly 12 may shortcut the power source 22 and the generator 30, thereby directly providing electrical power to the drive motors 32. For simplicity in description and clarity of illustration, the electrical components of the pantograph assembly 12 are not shown in the drawings except where the components are helpful for a complete description of the embodiments in accordance with the present disclosure.

Figures 2, 3:
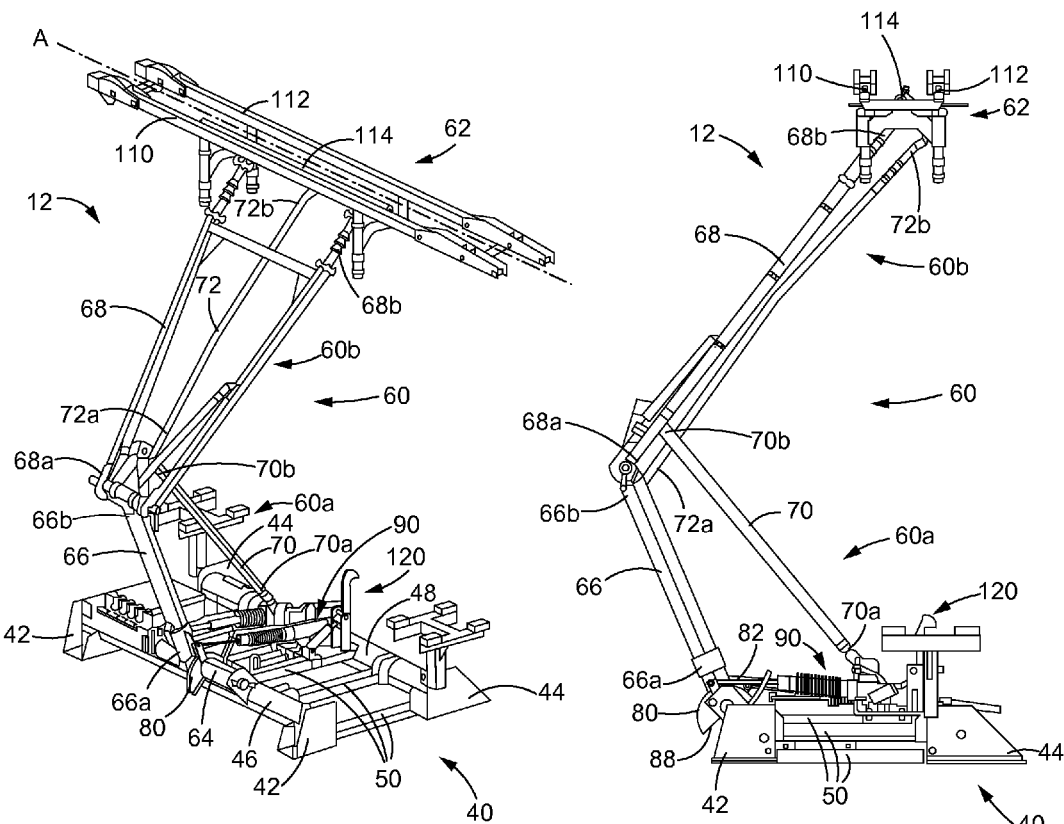
FIG. 2 is an isometric view of an embodiment of the pantograph assembly of FIG. 1 in the raised position.
FIG. 3 is a side view of the pantograph assembly of FIG. 2 in the raised position.

FIGS. 2-5 illustrate an embodiment of the pantograph assembly 12 in accordance with the present disclosure in a raised position. Referring to FIGS. 2 and 3, the pantograph assembly 12 may include a pantograph base 40 having a pair of front base feet 42 and a pair of rear base feet 44 that may be permanently or detachably mounted on the front of the machine 10 to secure the pantograph assembly 12. The front base feet 42 and the rear base feet 44 may be mounted on the front of the machine 10 by using nuts and bolts or other appropriate type of temporary or permanent fastening mechanisms. Insulating members (not shown), such as rubber or plastic bellows, designed to keep the pantograph base 40 electrically insulated from the machine 10 may be provided at the pairs of front base feet 42 and rear base feet 44. Moreover, the pantograph assembly 12 may be mounted on the top of the machine 10 or at any other appropriate location on the machine to facilitate selective engagement of the overhead conductors 34. A front base cross-member 46 (FIG. 2) may extend between the front base feet 42, a rear base cross-member 48 (FIG. 2) may extend between the rear base feet 44, and a plurality of base support members 50 may extend from front to back of the pantograph base 40 between the front base cross-member 46 and the rear base cross-member 48 or corresponding pairs of the front base feet 42 and the rear base feet 44 so that other components of the pantograph assembly 12 can be mounted to and supported by the front base cross-member 46 and the rear base cross-member 48 and the base support members 50.

Figure 6:
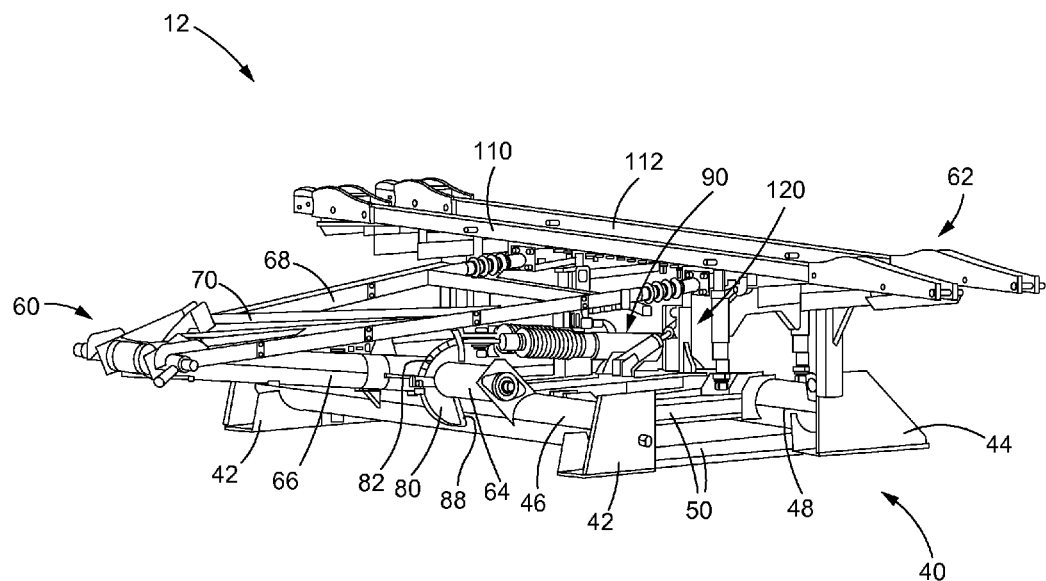
FIG. 6 is an isometric view of the pantograph assembly of FIG. 2 in a lowered position.

An articulated linkage assembly 60 may be mounted on the pantograph base 40. The articulated linkage assembly 60 may be configured to move a collector rail assembly 62 of the pantograph assembly 12 between a predetermined upper limit position shown in FIGS. 2 and 3 and a predetermined lower limit position shown in FIG. 6. At the predetermined upper limit position, the collector rail assembly 62 may be held in contact with the overhead conductors 34. In the predetermined lower limit position, the articulated linkage assembly 60 and the collector rail assembly 62 are withdrawn from the overhead conductors 34 and the machine 10 is not operating off the electrical power provided by the overhead conductors 34.

The articulated linkage assembly 60 in the illustrated embodiment (FIGS. 2 and 3) may include a linkage assembly lower end 60a operatively connected to the pantograph base 40 and a linkage assembly upper end 60b operatively connected between the linkage assembly lower end 60a and the collector rail assembly 62. The linkage assembly lower end 60a may include a thrust rod 64 (FIGS. 2 and 4) pivotally mounted to the front base cross-member 46 of the pantograph base 40, and a lower arm 66 having a lower arm first end 66a connected to the thrust rod 64 so that the lower arm 66 will rotate with the thrust rod 64. The linkage assembly upper end 60b may include an upper arm 68 having an upper arm first end 68a pivotally connected to a lower arm second end 66b and an upper arm second end 68b pivotally connected to the collector rail assembly 62.

The linkage assembly lower end 60a of the articulated linkage assembly 60 may further include a lower link 70 having a lower link first end 70a pivotally connected to the pantograph base 40 and a lower link second end 70b pivotally connected to the upper arm 68 proximate the upper arm first end 68a. An upper link 72 of the linkage assembly upper end 60b may have an upper link first end 72a pivotally connected to the lower arm 66 proximate the lower arm second end 66b and an upper link second end 72b pivotally connected to the collector rail assembly 62. The lower arm 66, the upper arm 68, the lower link 70 and the upper link 72 of the articulated linkage assembly 60 may be configured and interconnected such that the collector rail assembly 62 maintains an upright orientation and travels in a substantially vertical path as the articulated linkage assembly 60 moves the collector rail assembly 62 between the predetermined upper limit position shown in FIGS. 2 and 3 and the predetermined lower limit position shown in FIG. 6.

Rotation of the thrust rod 64 in a first thrust rod direction raises the collector rail assembly 62 relative to the pantograph base 40. Rotation in the first thrust rod direction may be clockwise rotation of the thrust rod 64 as indicated by the arrow 74 in the partial cross-sectional side view of FIG. 4. Rotation of the thrust rod 64 in a second thrust rod direction lowers the collector rail assembly 62 relative to the pantograph base 40. Rotation in the second thrust rod direction may be counterclockwise rotation as indicated by the arrow 76 in FIG. 4. The extent of the rotation of the thrust rod 64 in either direction, may be controlled by providing a stop means such as a stop member 80 to function in cooperation with the pantograph base 40 and the articulated linkage assembly 60 to limit the rotation of the thrust rod 64. The stop member 80 may also be referred to as a down stop. Limiting the rotation of the thrust rod 64 with the stop member 80 correspondingly restricts movement of the pantograph assembly 12 to that between the predetermined upper limit position and the predetermined lower limit position. The stop member 80 may be operatively connected to one of the pantograph base 40 and the articulated linkage assembly 60 and engage the other of the pantograph base 40 and the articulated linkage assembly 60 to prevent the articulated linkage assembly 60 and the collector rail assembly 62 from being lowered toward the pantograph base 40 below the predetermined lower limit position.

Figure 4:
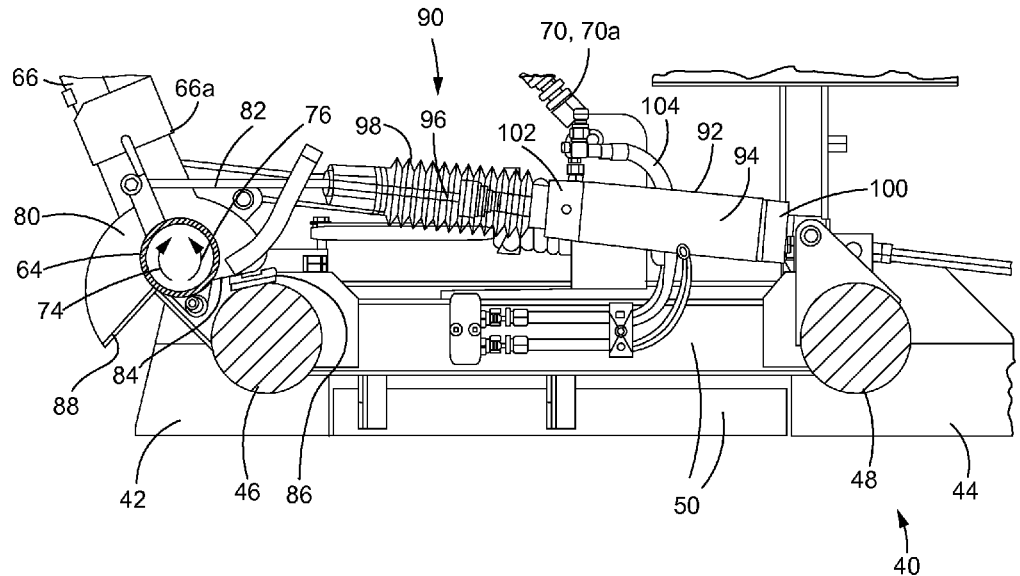
FIG. 4 is an enlarged partial cross-sectional view of the pantograph assembly of FIG. 2 in the raised position and illustrating embodiments of a stop member and a lift actuator in accordance with the present disclosure.
Figure 7:
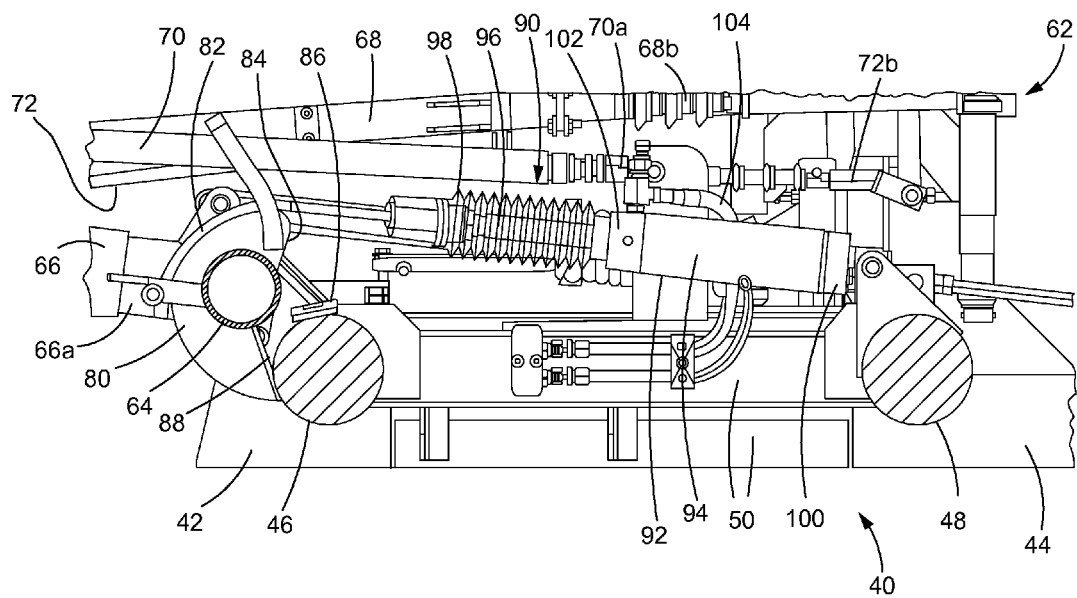
FIG. 7 is an enlarged partial cross-sectional view of the pantograph assembly of FIG. 2 in the lowered position and illustrating the stop member and the lift actuator of FIG. 4.

In the illustrated embodiment, the stop member 80 may be mounted on and rotatable with the thrust rod 64 of the linkage assembly lower end 60a. The stop member 80 may rotate into engagement with the front base cross-member 46 of the pantograph base 40 at the predetermined lower limit position to prevent further lowering of the lower arm 66 and the pantograph assembly 12. The stop member 80 may be generally arc-shaped and have a stop member inner surface having an inner diameter that is approximately equal to an outer diameter of a thrust rod outer surface of the thrust rod 64, and a stop member outer surface that may be shaped to function as a camming or guide surface for a lift cable 82 as discussed further below. One end of the stop member 80 may define an upper limit surface 84 configured to engage the front base cross-member 46 when the pantograph assembly 12 reaches the predetermined upper limit position as seen in FIG. 4. In the present embodiment, the front base cross-member 46 may have an upper limit stop pad 86 mounted thereon and engaged by the upper limit surface 84 to stop the pantograph assembly 12 at the predetermined upper limit position. An opposite end of the stop member 80 may define a lower limit surface 88 configured to engage the front base cross-member 46 when the pantograph assembly 12 reaches the predetermined lower limit position as seen in FIG. 7. The lower limit surface 88 may also be referred to as a down stop surface. A similar lower limit stop pad (not shown) may be mounted on the front base cross-member 46 at a position to be engaged by the lower limit surface 88 of the stop member 80. The stop member 80 may be a separate component connected to an outer surface of the thrust rod 64, or may be integrally formed with the thrust rod 64 as a single unitary component during the manufacturing process.

While the stop member 80 is shown in FIGS. 2, 4, 6 and 7 as being mounted on the thrust rod 64 and engaging the front base cross-member 46, alternative arrangements for the stop member 80 to limit movement of the pantograph assembly 12 are possible and such alternatives are contemplated by the inventor as having use in pantograph assemblies 12 in accordance with the present disclosure. For example, the stop member 80 may be mounted to the front base cross-member 46 or other component of the pantograph base 40, with the upper limit surface 84 and the lower limit surface 88 engaging the thrust rod 64 or other component of the articulated linkage assembly 60 at the corresponding limit positions of the pantograph assembly 12. In one embodiment, the thrust rod 64 may have an ovoid or other appropriate cross-sectional shape so that the thrust rod 64 is disengaged from the upper limit surface 84 and the lower limit surface 88 as the thrust rod 64 rotates between the limit positions, but rotates into engagement with the upper limit surface 84 and the lower limit surface 88 when the thrust rod 64 rotates to the corresponding limit position. Additional configurations and interactions between the pantograph base 40, the articulated linkage assembly 60 and a stop means such as the stop member 80 are contemplated.

Movement of the pantograph assembly 12 between the limit positions may be controlled by a lift actuator 90 (FIGS. 4 and 7) that may be operatively coupled the pantograph base 40 and one of the thrust rod 64, the lower arm 66 and the stop member 80. The lift actuator 90 may be actuated to generate a torque to rotate the thrust rod 64 and the lower arm 66 in the first thrust rod direction to raise the collector rail assembly 62 relative to the pantograph base 40. In the illustrated embodiment, the lift actuator 90 may include a linear actuator 92 operatively connected to the pantograph base 40 and being actuatable to move from an extended position toward a retracted position. The lift actuator 90 may further include the lift cable 82 operatively connected between the linear actuator 92 and the stop member 80. Due to the coupling between the lift cable 82 and the stop member 80, and the connection of the stop member 80 to the thrust rod 64, the thrust rod 64 may rotate in the first thrust rod direction when the linear actuator 92 moves from the extended position toward the retracted position and correspondingly raise the collector rail assembly 62. Conversely, the thrust rod 64 may rotate in the second thrust rod direction when the linear actuator 92 moves from the retracted position toward the extended position.

As best seen in FIGS. 4 and 7, the linear actuator 92 may be implemented in the form of a hydraulic cylinder actuator having a piston head (not shown) disposed within a cylinder body 94 and a piston rod 96 (visible through a flexible sleeve 98 illustrated as transparent) extending out of the cylinder body 94. A head end 100 of the cylinder body 94 may be connected to the pantograph base 40, and a rod end 102 of the cylinder body 94 may have the piston rod 96 extending therefrom and attached to a first end 82a of the lift cable 82. A second end 82b of the lift cable 82 may be connected to the stop member 80 to allow the linear actuator 92 to apply torque to the stop member 80 and correspondingly to the thrust rod 64. The rod end 102 of the linear actuator 92 may receive pressurized fluid from a pressurized fluid source (not show) via a rod end fluid supply line 104.

When the pantograph assembly 12 is in the lowered position shown in FIG. 7, the piston head and piston rod 96 may be in the extended position with the piston head disposed proximate the rod end 102 of the linear actuator 92 and the piston rod 96 extending from the linear actuator 92. The extension of the piston rod 96 and corresponding decrease in tension in the lift cable 82 allow the stop member 80 and the thrust rod 64 to rotate to the lowered position with the lower limit surface 88 of the stop member 80 engaging the front base cross-member 46. In this position, the lift cable 82 may be partially wrapped around the outer surface of the stop member 80. When it is desired to raise the pantograph assembly 12 to the raised position of FIG. 4, pressurized fluid from the pressurized fluid source is directed to the rod end 102 of the linear actuator 92 via the rod end fluid supply line 104 to increase the pressure in the rod end 102 and move the piston head and the piston rod 96 toward the head end 100 of the linear actuator 92 and the retracted position against the weight of the pantograph assembly 12. As the piston head and piston rod 96 move, tension in the lift cable 82 increases and creates a torque on the stop member 80 and the thrust rod 64 to rotate the thrust rod 64 and the lower arm 66 in the direction to raise the collector rail assembly 62 via the articulated linkage assembly 60. The pressurized fluid may be added to the rod end 102 of the linear actuator 92 until the upper limit surface 84 of the stop member 80 rotates into engagement with the front base cross-member 46 and the pantograph assembly 12 is fully raised. When it is desired to lower the pantograph assembly 12, the pressurized fluid in the rod end 102 of the linear actuator 92 may be drained to a low pressure reservoir (not shown) to allow the piston head and piston rod 96 to move toward the lowered position of FIG. 7 due to the weight of the pantograph assembly 12 communicated to the linear actuator 92 by the lift cable 82. If helpful, a head end fluid supply line (not shown) may provide fluid to the head end 100 of the linear actuator 92 as the piston head moves toward the extended position to avoid cavitation or creation of a vacuum behind the piston head that can disturb smooth movement as the pantograph assembly 12 is lowered.

In alternative embodiments, the lift actuator 90 may include a solenoid actuator or other appropriate type of linear actuator capable of creating linear motion as described in the present application. In further alternative embodiments, the lift actuator 90 may include a rotary actuator such as a stepper motor operatively connected to the stop member 80 or the thrust rod 64 by a linkage or other appropriate mechanism known in the art for converting rotation generated by the rotary actuator into the rotation of the thrust rod 64 described in this application. In still further embodiments, a rotary actuator may be connected directly to the stop member 80 or the thrust rod 64 to directly drive the thrust rod 64 in at least the first thrust rod direction to raise the pantograph assembly 12. Any other appropriate type of lift actuator means that is capable of causing the articulated linkage assembly 60 to move between the predetermined upper and lower limit positions as described in the present application are contemplated for use in the pantograph assemblies 12 in accordance with the present disclosure.

As shown in FIG. 2, the collector rail assembly 62 may extend along a longitudinal axis A that is approximately perpendicular to a direction of travel of the machine 10 and to the overhead conductors 34. The collector rail assembly 62 may include a pair of rails such as a first collector rail 110 and a second collector rail 112 that are approximately parallel to each other, to the longitudinal axis A and to the work surface 14. The lower arm 66, the upper arm 68, the lower link 70 and the upper link 72 of the articulated linkage assembly 60 may be configured and interconnected such that the first collector rail 110 and the second collector rail 112 of the collector rail assembly 62 remain parallel to each other and to the work surface 14 and perpendicular to the overhead conductors 34 as the articulated linkage assembly 60 moves the collector rail assembly 62 between the predetermined upper limit position shown in FIGS. 2 and 3 and the predetermined lower limit position shown in FIG. 6 so that both the first collector rail 110 and the second collector rail 112 engage the overhead conductors 34 when the articulated linkage assembly 60 is in the upper limit position. The collector rail assembly 62 may also include a metallic frame (not shown) and carbon brushes (not shown) supported by the metallic frame. It will be apparent that the carbon brushes may be designed to provide an electrical contact with the overhead conductors 34.

Figures 5, 8:
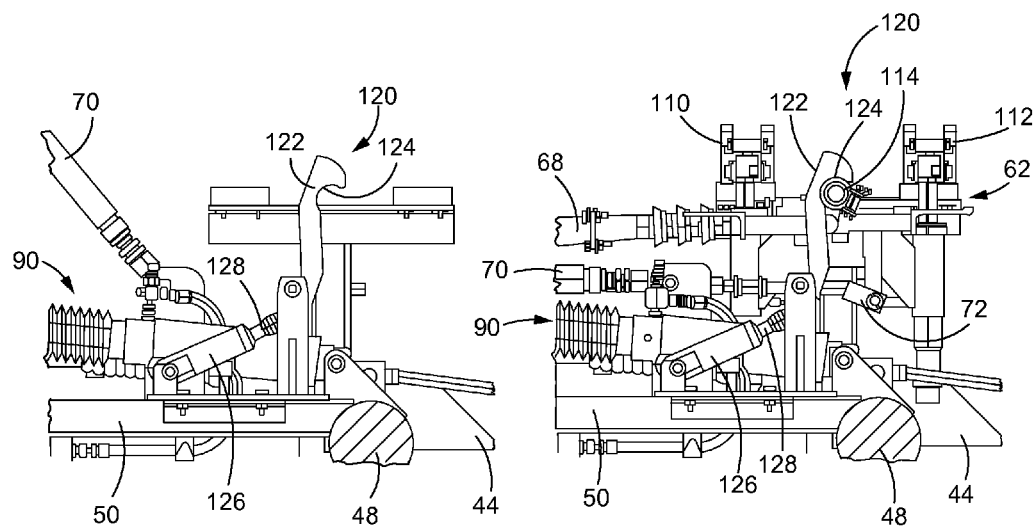
FIG. 5 is an enlarged partial cross-sectional view of the pantograph assembly of FIG. 2 in the raised position and illustrating an embodiment of a latch assembly in accordance with the present disclosure.
FIG. 8 is an enlarged partial cross-sectional view of the pantograph assembly of FIG. 2 in the lowered position and illustrating the latch assembly of FIG. 5.
Figure 9:
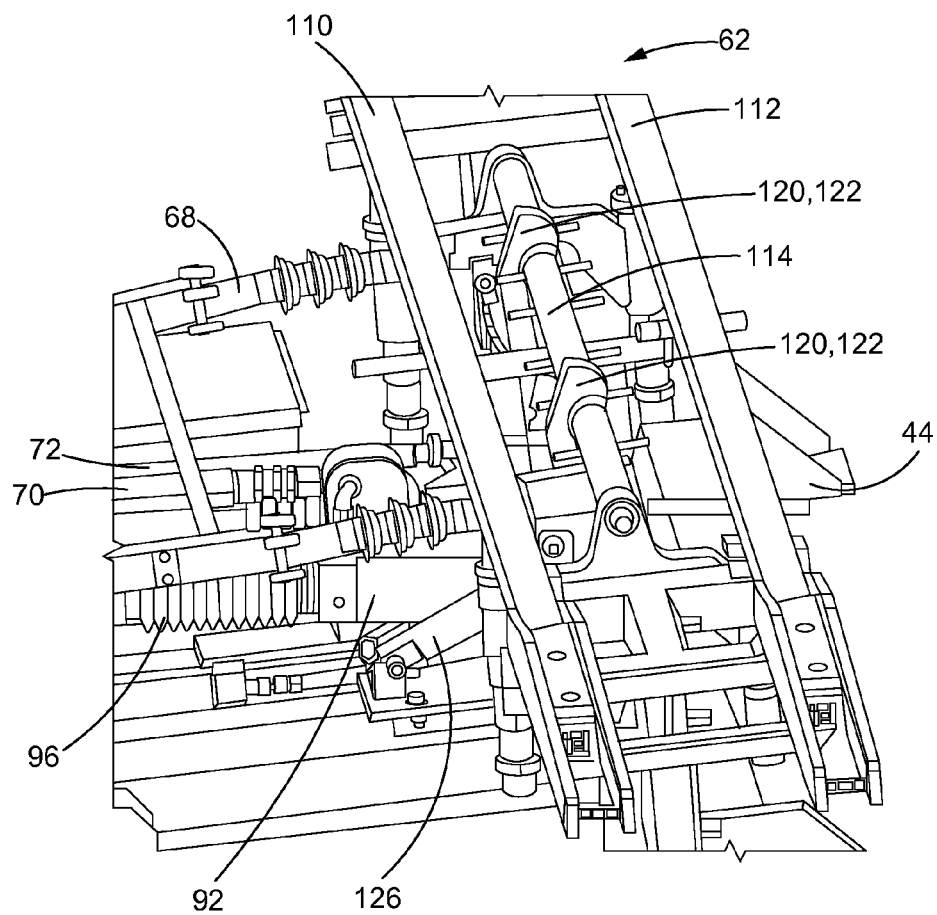
FIG. 9 is an enlarged isometric view of the pantograph assembly of FIG. 2 in the lowered position and illustrating a pair of the latch assemblies of FIG. 5.

The collector rail assembly 62 may further include a locking bar 114 oriented approximately parallel to the first collector rail 110 and the second collector rail 112. The pantograph assembly 12 may further include a latch assembly 120 (FIGS. 5 and 8) configured to engage the locking bar 114 when the pantograph assembly 12 is at the predetermined lower limit position as shown in FIG. 8 to prevent the collector rail assembly 62 from moving upwardly from the predetermined lower limit position relative to the pantograph base 40 as the machine 10 moves over a work surface 14. As shown in the enlarged view of FIG. 9, the pantograph assembly 12 may include a pair of latch assemblies 120 configured to engage the locking bar 114 when the pantograph assembly 12 is at the predetermined lower limit position. The combination of the stop member 80 and the latch assemblies 120 reduces the downward movement of the pantograph assembly 12 and the possibility of the latch assemblies 120 unlatching from the locking bar 114 when the pantograph assembly 12 is subjected to high gravity loads, or G-loads, as the machine 10 moves over the work surface 14. The additional latch assembly 120 may allow the G-loads to be distributed between the latch assemblies 120.

Each latch assembly 120 may include a latch member 122 pivotally mounted on the pantograph base 40 and having a latch hook 124, and a latch actuator 126 operatively connected to the latch member 122 and operable to move the latch member 122 between a latch locked position as shown and a latch unlocked position (not shown) through a counterclockwise rotation as shown in FIGS. 5 and 8. The latch actuator 126 may move the latch member 122 to the latch locked position through a clockwise rotation when the collector rail assembly 62 is in the predetermined lower limit position to engage the locking bar 114 as shown in FIG. 8. The latch actuator 126 as shown may be a hydraulic cylinder actuator similar to the linear actuator 92 of the lift actuator 90 described above where pressurized fluid from a fluid source may alternately extend a piston rod 128 to rotate the latch member 122 to an unlocked position and retract the piston rod 128 to rotate the latch member 122 to a locked position and engage the locking bar 114. Alternatively, the latch actuator 126 may be any other appropriate linear or rotary actuator such as those described above operatively coupled to the latch member 122 to move the latch member 122 between the locked and the unlocked positions.

INDUSTRIAL APPLICABILITY

The arrangement of the pantograph assembly 12 illustrated and described in the present application may provide a relative simple and effective mechanism for securing the pantograph assembly 12 in the predetermined lower limit position and preventing undue wear and tear and stresses on the components of the pantograph assembly 12 that can require frequent maintenance and cause premature failure of the components. Without the engagement of the lower limit surface 88 of the stop member 80 with the front base cross-member 46, the latch assembly 120 may retain the pantograph assembly 12 in the lowered position, but the components of the articulated linkage assembly 60 are afforded a freedom of movement allowing the components to bounce up and down as the machine 10 traverses the work surface 14. The movement can cause high stresses in the lift cable 82 that can increase the risk of the lift cable 82 breaking or detaching from the piston rod 96 of the lift actuator 90. Moreover, slack between the latch hook 124 and the locking bar 114 can result in disengagement of the latch hook 124 from the locking bar 114 and unintended deployment of the pantograph assembly 12 as the machine 10 travels through the work area.

The engagement of the front base cross-member 46 by the lower limit surface 88 of the stop member 80 can further restrict the motion of the components of the articulated linkage assembly 60 when the pantograph assembly 12 is lowered. Restriction from further downward movement of the articulated linkage assembly 60 and rotation of the thrust rod 64 prevents additional stresses from being applied to the lift cable 82 when the lift actuator 90 is in the extended position. The lower limit also reduces or eliminates the slack between the latch hook 124 and the locking bar 114, thereby correspondingly reducing the chances that the latch hook 124 will disengage from the locking bar 114.

Additionally, effective engagement of the latch assembly 120 with the locking bar 114 is achievable with a simpler motion than devices having a combination of rotational and translational motion. The latch member 122 moves through pure rotation into engagement with the locking bar 114 instead of through a more complex combination of rotation and translation. The simpler motion may allow for a simpler and less expensive design for the latch member 122. However, latching devices with more complex movement could be implemented in the pantograph assembly 12 in accordance with the present disclosure if such a mechanism is necessitated by the operating requirements for a particular machine 10.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A pantograph assembly configured to transfer electrical power from an overhead conductor to a machine, the pantograph assembly comprising:
   a pantograph base detachably mounted to the machine;
   an articulated linkage assembly having a linkage assembly lower end operatively connected to the pantograph base and a linkage assembly upper end pivotally connected to the linkage assembly lower end;
   a collector rail assembly operatively connected to the linkage assembly upper end,
   wherein the collector rail assembly comprises a locking bar;
   a stop member:
      connected to the pantograph base and engaging the articulated linkage assembly, or connected to the articulated linkage assembly and engaging the pantograph base,
      to prevent the articulated linkage assembly from being lowered toward the pantograph base below a predetermined lower limit position; and
   a plurality of latch assemblies, each of the plurality of latch assemblies comprising:
      a latch member pivotally mounted on the pantograph base and having a latch hook; and
      a latch actuator operatively connected to the latch member and operable to move the latch member between a latch locked position and a latch unlocked position,
      the latch member preventing the articulated linkage assembly and the collector rail assembly from moving upwardly from the predetermined lower limit position as the machine moves over a work surface, and
      the stop member and the plurality of latch assemblies reducing a downward movement of the pantograph assembly and reducing a possibility of the plurality of latch assemblies unlatching from the locking bar.

2. The pantograph assembly of claim 1, wherein the linkage assembly lower end comprises a thrust rod pivotally mounted to the pantograph base, wherein rotation of the thrust rod in a first thrust rod direction raises the articulated linkage assembly relative to the pantograph base and rotation of the thrust rod in a second thrust rod direction that is opposite the first thrust rod direction lowers the articulated linkage assembly relative to the pantograph base.

3. The pantograph assembly of claim 2, wherein the stop member is connected to and rotates with the thrust rod of the linkage assembly lower end, and wherein the stop member rotates into engagement with the pantograph base at the predetermined lower limit position to prevent the articulated linkage assembly from being lowered below the predetermined lower limit position.

4. The pantograph assembly of claim 3, wherein the pantograph base comprises a base cross-member with the thrust rod being pivotally mounted thereon.

5. The pantograph assembly of claim 3, further comprising a lift actuator operatively coupled to one of the thrust rod or the stop member, the lift actuator being actuated to rotate the thrust rod in the first thrust rod direction to raise the articulated linkage assembly relative to the pantograph base.

6. The pantograph assembly of claim 5, wherein the lift actuator comprises:
   a linear actuator operatively connected to the pantograph base and being actuated to move from an extended position toward a retracted position; and
   a lift cable operatively connected between the linear actuator and the stop member, wherein the thrust rod rotates in the first thrust rod direction when the linear actuator moves from the extended position toward the retracted position, and the thrust rod rotates in the second thrust rod direction when the linear actuator moves from the retracted position toward the extended position.

7. The pantograph assembly of claim 1, wherein the linkage assembly lower end comprises a thrust rod pivotally mounted to the pantograph base, wherein the stop member is connected to and rotates with the thrust rod of the linkage assembly lower end, and wherein the stop member engages the pantograph base to prevent the articulated linkage assembly and the collector rail assembly from being raised relative to the pantograph base above a predetermined upper limit position.

8. The pantograph assembly of claim 7, wherein the pantograph base comprises a base cross-member, wherein rotation of the thrust rod in a first thrust rod direction raises the articulated linkage assembly relative to the pantograph base and rotation of the thrust rod in a second thrust rod direction lowers the articulated linkage assembly relative to the pantograph base, wherein the stop member is mounted on and rotates with the thrust rod of the linkage assembly lower end, and wherein the stop member rotates into engagement with the pantograph base at the predetermined upper limit position to prevent the articulated linkage assembly from being raised above the predetermined upper limit position.

9. The pantograph assembly of claim 1,
wherein the latch actuator moves the latch member to the latch locked position when the collector rail assembly is in the predetermined lower limit position to engage the locking bar.

10. A pantograph assembly configured to transfer electrical power from an overhead conductor to a machine, the pantograph assembly comprising:
a pantograph base detachably mounted to the machine;
an articulated linkage assembly comprising:
a thrust rod pivotally mounted to the pantograph base,
a lower arm having a lower arm first end connected to the thrust rod, and
an upper arm having an upper arm first end pivotally connected to a lower arm second end of the lower arm;
a collector rail assembly operatively connected to an upper arm second end of the upper arm of the articulated linkage assembly and having a locking bar,
wherein rotation of the thrust rod in a first thrust rod direction raises the articulated linkage assembly relative to the pantograph base and rotation of the thrust rod in a second thrust rod direction opposite the first thrust rod direction lowers the articulated linkage assembly relative to the pantograph base;
a stop member mounted on and rotatable with the thrust rod, and having a lower limit surface that rotates into engagement with the pantograph base to prevent the articulated linkage assembly and the collector rail assembly from being lowered toward the pantograph base below a predetermined lower limit position; and
a plurality of latch assemblies,
each latch assembly, of the plurality of latch assemblies, being mounted on the pantograph base and operable to move between a latch locked position and a latch unlocked position,
wherein the latch assembly is actuated to move to the latch locked position and engage the locking bar when the articulated linkage assembly is in the predetermined lower limit position,
wherein the latch assembly when engaging the locking bar prevents the articulated linkage assembly and the collector rail assembly from moving upwardly from the predetermined lower limit position as the machine moves over a work surface, and
the stop member and the plurality of latch assemblies reducing a downward movement of the pantograph assembly and reducing a possibility of the plurality of latch assemblies unlatching from the locking bar.

11. The pantograph assembly of claim 10, wherein the articulated linkage assembly further comprises:
a lower link having a lower link first end pivotally connected to the pantograph base and a lower link second end pivotally connected to the upper arm proximate the upper arm first end; and
an upper link having an upper link first end pivotally connected to the lower arm proximate the lower arm second end and an upper link second end pivotally connected to the collector rail assembly, wherein the collector rail assembly maintains an upright orientation as the articulated linkage assembly moves the collector rail assembly between the predetermined lower limit position and a predetermined upper limit position.

12. The pantograph assembly of claim 10, comprising a lift actuator operatively coupled to one of the thrust rod and the stop member, the lift actuator being actuated to rotate the thrust rod in the first thrust rod direction to raise the articulated linkage assembly relative to the pantograph base.

13. The pantograph assembly of claim 12, wherein the lift actuator comprises:
a linear actuator operatively connected to the pantograph base and being actuated to move from an extended position toward a retracted position; and
a lift cable operatively connected between the linear actuator and the stop member, wherein the thrust rod rotates in the first thrust rod direction when the linear actuator moves from the extended position toward the retracted position, and the thrust rod rotates in the second thrust rod direction when the linear actuator moves from the retracted position toward the extended position.

14. The pantograph assembly of claim 10, wherein the latch assembly comprises:
a latch member pivotally mounted on the pantograph base and having a latch hook; and
a latch actuator operatively connected to the latch member and operable to move the latch member between the latch locked position and the latch unlocked position, wherein the latch actuator moves the latch member to the latch locked position and into engagement with the locking bar when the articulated linkage assembly is in the predetermined lower limit position, wherein the latch member when engaging the locking bar prevents the articulated linkage assembly and the collector rail assembly from moving upwardly from the predetermined lower limit position as the machine moves over the work surface.

15. The pantograph assembly of claim 10, wherein the stop member engages the pantograph base to prevent the articulated linkage assembly and the collector rail assembly from being raised relative to the pantograph base above a predetermined upper limit position.

16. The pantograph assembly of claim 10, wherein the pantograph base comprises a base cross-member with the thrust rod being pivotally mounted thereon, and wherein the lower limit surface of the stop member engages the base cross-member to prevent the articulated linkage assembly and the collector rail assembly from being lowered toward the pantograph base below the predetermined lower limit position.

17. A pantograph assembly configured to transfer electrical power from an overhead conductor to a machine, the pantograph assembly comprising:

a pantograph base detachably mounted to the machine;

an articulated linkage assembly having a linkage assembly lower end operatively connected to the pantograph base and a linkage assembly upper end pivotally connected to the linkage assembly lower end;

a collector rail assembly operatively connected to the linkage assembly upper end, wherein the collector rail assembly comprises a locking bar;

a stop member operatively connected to the articulated linkage assembly and engaging the pantograph base to prevent the articulated linkage assembly and the collector rail assembly from being lowered toward the pantograph base below a predetermined lower limit position; and a plurality of latch assemblies, each of the plurality of latch assemblies comprising:

a latch member pivotally mounted on the pantograph base, and a latch actuator operatively connected to the latch member and operable to move the latch member between a latch locked position and a latch unlocked position, the latch member preventing the articulated linkage assembly and the collector rail assembly from moving upwardly from the predetermined lower limit position as the machine moves over a work surface, and the stop member and the plurality of latch assemblies reducing a downward movement of the pantograph assembly and reducing a possibility of the plurality of latch assemblies unlatching from the locking bar.

18. The pantograph assembly of claim 17, wherein the stop member is mounted on the articulated linkage assembly, the stop member having a lower limit surface that rotates into engagement with the pantograph base to prevent the articulated linkage assembly and the collector rail assembly from being lowered toward the pantograph base below the predetermined lower limit position.

19. The pantograph assembly of claim 18, wherein the stop member comprises an upper limit surface that rotates into engagement with the pantograph base to prevent the articulated linkage assembly and the collector rail assembly from being raised relative to the pantograph base above a predetermined upper limit position.

20. The pantograph assembly of claim 18, comprising a lift actuator operatively coupled to the stop member, the lift actuator being actuated to cause the articulated linkage assembly to raise the collector rail assembly relative to the pantograph base.

* * * * *